United States Patent
Oya et al.

(10) Patent No.: US 10,483,013 B2
(45) Date of Patent: Nov. 19, 2019

(54) INSULATED WIRE EXCELLENT IN BENDING RESISTANCE, AS WELL AS COIL AND ELECTRIC OR ELECTRONIC EQUIPMENT USING THE SAME

(71) Applicants: FURUKAWA ELECTRIC CO., LTD., Tokyo (JP); FURUKAWA MAGNET WIRE CO., LTD., Tokyo (JP)

(72) Inventors: Makoto Oya, Tokyo (JP); Tsuneo Aoi, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 130 days.

(21) Appl. No.: 15/632,026

(22) Filed: Jun. 23, 2017

(65) Prior Publication Data
US 2017/0294249 A1  Oct. 12, 2017

Related U.S. Application Data

(63) Continuation of application No. PCT/JP2015/075973, filed on Sep. 14, 2015.

(30) Foreign Application Priority Data

Dec. 26, 2014 (JP) .............................. 2014-265391

(51) Int. Cl.
*H01B 7/02* (2006.01)
*H01F 5/06* (2006.01)
(Continued)

(52) U.S. Cl.
CPC .............. *H01B 7/02* (2013.01); *H01B 3/307* (2013.01); *H01B 3/308* (2013.01); *H01B 3/427* (2013.01);
(Continued)

(58) Field of Classification Search
CPC .. H01B 3/308; H01B 7/00; H01B 7/02; H01F 5/06; H02K 3/30
See application file for complete search history.

(56) References Cited

U.S. PATENT DOCUMENTS 5,834,140 A * 11/1998 Wolski ..................... C25D 1/04
                                                                      429/220
6,512,186 B1 * 1/2003 Nishiwaki .............. H05K 3/384
                                                                      174/255

(Continued)

FOREIGN PATENT DOCUMENTS

JP         61-161607 A      7/1986
JP         2009-123418 A    6/2009
(Continued)

OTHER PUBLICATIONS

International Search Report for PCT/JP2015/075973 (PCT/ISA/210) dated Nov. 2, 2015.
(Continued)

*Primary Examiner* — William H. Mayo, III
*Assistant Examiner* — Rhadames Alonzo Miller
(74) *Attorney, Agent, or Firm* — Birch, Stewart, Kolasch & Birch, LLP (57) ABSTRACT

An insulated wire having an insulating coat layer on the conductor outer peripheral surface having a rectangular cross-sectional shape and also having a long side, a short side, and a corner portion with a curvature radius Rc,
wherein a thickness t1 of the insulating coat layer covered on the surface, and which layer includes a long side, a thickness t2 of the insulating coat layer covered on the surface, and which layer includes a short side, and a corner portion thickness t3 of the insulating coat layer satisfy formula (1):

$t3/\{(t1+t2)/2\} \geq 1.2$  Formula (1)

(Continued)

wherein the t1 and t2 are each independently from 20 μm to 50 μm, and wherein a ratio of the conductor cross-sectional area Sc to the insulated wire cross-sectional area Sw satisfies formula (2)

$$1.0 > Sc/Sw \geq 0.8; \quad \text{Formula (2)}$$

as well as a coil and an electric or electronic equipment using the same.

6 Claims, 1 Drawing Sheet

(51) Int. Cl.
*H01B 7/00* (2006.01)
*H02K 3/30* (2006.01)
*H01B 3/42* (2006.01)
*H01B 3/30* (2006.01)

(52) U.S. Cl.
CPC ............... *H01B 7/00* (2013.01); *H01F 5/06* (2013.01); *H02K 3/30* (2013.01); *H01B 3/30* (2013.01); *H01B 3/42* (2013.01)

(56) References Cited

U.S. PATENT DOCUMENTS

| | | | | |
|---|---|---|---|---|
| 2004/0201013 A1* | 10/2004 | Faris | ............... | B81C 1/00119 257/40 |
| 2007/0001319 A1* | 1/2007 | Bauer | ............... | H01L 23/3142 257/783 |
| 2007/0040643 A1* | 2/2007 | Inoue | ............... | H01F 17/045 336/213 |
| 2007/0065639 A1* | 3/2007 | Iida | ............... | H05K 3/1266 428/141 |
| 2007/0128827 A1* | 6/2007 | Faris | ............... | H01L 21/76254 438/455 |
| 2007/0135013 A1* | 6/2007 | Faris | ............... | H01J 9/125 445/49 |
| 2008/0164050 A1* | 7/2008 | Kamibayashi | ............... | H01F 27/323 174/119 R |
| 2009/0146280 A1* | 6/2009 | Shimazaki | ............... | C25D 5/12 257/676 |
| 2010/0203231 A1* | 8/2010 | Kusaka | ............... | H01B 3/301 427/9 |
| 2011/0155433 A1* | 6/2011 | Funaya | ............... | H01L 23/49827 174/258 |
| 2013/0008685 A1* | 1/2013 | Matsushita | ............... | H01B 3/46 174/110 R |
| 2013/0037304 A1* | 2/2013 | Ikeda | ............... | H01B 3/306 |
| 2013/0127038 A1* | 5/2013 | Ko | ............... | C09J 7/10 257/734 |
| 2013/0240244 A1* | 9/2013 | Honda | ............... | H01B 3/306 |
| 2014/0020929 A1* | 1/2014 | Hisada | ............... | H01B 7/0225 174/110 SR |
| 2014/0084713 A1* | 3/2014 | Kurahara | ............... | H02K 3/30 310/45 |
| 2014/0216340 A1* | 8/2014 | Kusaka | ............... | H01B 13/141 118/712 |
| 2015/0021067 A1 | 1/2015 | Muto et al. | | |
| 2015/0027748 A1 | 1/2015 | Fukuda et al. | | |
| 2015/0221412 A1* | 8/2015 | Caudill | ............... | H01B 3/427 428/339 |
| 2015/0326086 A1* | 11/2015 | Takahashi | ............... | H02K 3/12 310/45 |
| 2016/0307668 A1* | 10/2016 | Oya | ............... | H01F 5/06 |

FOREIGN PATENT DOCUMENTS

| | | |
|---|---|---|
| JP | 2010-123389 A | 6/2010 |
| JP | 2012-90441 A | 5/2012 |
| WO | WO 2014/084101 A1 | 6/2014 |
| WO | WO 2014/122828 A1 | 8/2014 |
| WO | WO 2014/175266 A1 | 10/2014 |
| WO | WO 2015/098637 A1 | 7/2015 |

OTHER PUBLICATIONS

Written Opinion of the International Searching Authority for PCT/JP2015/075973 (PCT/ISA/237) dated Nov. 2, 2015.

Extended European Search Report, dated Aug. 6, 2018, for corresponding European Application No. 15872373.4.

Korean Office Action dated Oct. 22, 2018 for corresponding Application No. 10-2017-7018929, along with an English translation.

\* cited by examiner

INSULATED WIRE EXCELLENT IN BENDING RESISTANCE, AS WELL AS COIL AND ELECTRIC OR ELECTRONIC EQUIPMENT USING THE SAME

CROSS-REFERENCE TO RELATED APPLICATIONS

This application is a Continuation of PCT International Application No. PCT/JP2015/075973 filed on Sep. 14, 2015, which claims priority under 35 U.S.C. § 119 (a) to Japanese Patent Application No. 2014-265391 filed in Japan on Dec. 26, 2014. Each of the above applications is hereby expressly incorporated by reference, in its entirety, into the present application.

TECHNICAL FIELD

The present invention relates to an insulated wire excellent in bending resistance, as well as a coil and an electric or electronic equipment using the same.

BACKGROUND ART

It has become demanded to enhance reliability by further improving various performances, such as heat resistance, mechanical properties, chemical property, and electrical property, in the electronic or electrical equipment (hereinafter, which may be simply referred to as electrical equipment) developed in recent years, as compared to the conventional electrical equipment. Under the situations, excellent abrasion resistance, thermal aging resistance property, and solvent resistance have become required for insulated wires, such as enameled wires, that are used as magnet wires for electrical equipment for aerospace use, electrical equipment for aircrafts, electrical equipment for nuclear power, electrical equipment for energy, and electrical equipment for automobiles.

Further, advance of electrical equipment represented by motors or transformers has been progressed resulting in size reduction and improved performance. Thus, it becomes usual in many cases that insulated wires are used in such a way that the insulated wires are worked by winding (also referred to as coil working) to winding wires and they are pushed into a quite small space to pack. Specifically, it is no exaggeration to say that the performance of a rotating electric machine, such as a motor, is determined by how many wound wires produced by coil working the insulated wires into a coil shape can be held in a stator slot. As a result, improvement of the ratio of the sectional area of conductors to the sectional area of the stator slot (space factor) has been required to be particularly highly increased.

It has been lately attempted to use a rectangular wire in which the conductor has a shape similar to a quadrilateral (square or rectangle), as a means for increasing the space factor.

However, while use of a rectangular wire exhibits a dramatic effect in increasing the space factor, a corner portion of cross-section rectangular is extremely brittle to bending working, such as coil working. Due to this, there is a problem that a coated film cracks when the rectangular wire is worked by applying strong pressure. In particular, it is known that the crack of the coated film tends to occur more easily as the curvature radius of the corner portion is smaller.

As the insulated wire using the rectangular wire, for example, Patent Literature 1 proposes an insulated wire having a high partial discharge inception voltage and an improved insulating property of the corner portion thereof, by bearing a predetermined relationship to each of thicknesses and dielectric constants with respect to the corner portion and the side portion of the insulating film. However, in order to increase the partial discharge inception voltage, thickening of the insulating film is needed, which results in lowering of the space factor.

Further, Patent Literature 2 discloses insulated wires having a suppressed gap between the insulated wires and an improved space factor, by inflecting a cross sectional shape of the insulating film thereof.

CITATION LIST

Patent Literatures

Patent Literature 1: Japanese Patent No. 5196532
Patent Literature 2: JP-A-2012-90441 ("JP-A" means unexamined published Japanese patent application)

SUMMARY OF INVENTION

Technical Problem

The winding wire used for a motor is subjected to a strong bending working force at the time of producing the motor. In addition to this, in a case where an insulating film was thinned for downsizing, the insulating film tears easily when the corner portion thereof was grazed.

In future, further downsizing and an increase in space factor are inevitable, so that further lessening of a curvature radius of the conductor is required.

Accordingly, the present invention is contemplated for providing an insulated wire which has a high space factor by thinning an insulating coat layer, and which is also excellent in edge-wise and flat-wise bending workability and dielectric breakdown strength after extension.

Further, the present invention is contemplated for providing, by using the insulated wire having the above-described excellent performance, a down-sizable and enhancement of performance-realizable coil and electronic or electrical equipment, each of which can prevent occurrence of cracks in the insulating coat layer due to a bending working in the production of a motor or the like, and each of which has a high space factor and also is excellent in maintenance of dielectric breakdown voltage even after the bending working.

Solution to Problem

Focusing attention on an edge-wise bending workability of bending an edge surface and a flat-wise bending workability of bending a flat surface, and further as a result of extensive studies, the inventors of the present invention have found that the edge-wise bending workability and the flat-wise bending workability of the insulated wire are improved and also an excellent dielectric breakdown strength after extension is achieved, by using an insulating coat layer bearing a particular relationship to the thickness at each of a corner portion, an edge surface, and a flat surface, and also having a particular thickness at each of the edge surface and the flat surface. The present invention has been completed by these findings.

Herein, the term "edge surface" means a surface that a short side of the transverse section of the rectangular wire forms sequentially in an axial direction, and the term "flat surface" means a surface that a long side of the transverse section of the rectangular wire forms sequentially in the axial direction.

That is, the problems of the present invention were solved by the following means.

(1) An insulated wire having an insulating coat layer comprising a thermoplastic resin on the outer peripheral surface of a conductor having a rectangular cross-sectional shape and also having a long side, a short side, and a corner portion having a curvature radius Rc, wherein a thickness t1 (μm) of the insulating coat layer covered on the surface which is continuing in an axial direction of the conductor, and which layer includes a long side of a transverse section of the conductor, a thickness t2 (μm) of the insulating coat layer covered on the surface which is continuing in the axial direction of the conductor, and which layer includes a short side of the transverse section of the conductor, and a corner portion thickness t3 (μm) of the insulating coat layer satisfy the relationship of formula (1):

$$t3/\{(t1+t2)/2\} \geq 1.2 \quad \text{Formula (1)}$$

wherein the t1 (μm) and t2 (μm) are each independently 20 μm or more and 50 μm or less, and wherein a ratio of a cross-sectional area Sc (mm$^2$) of the conductor to a cross-sectional area Sw (mm$^2$) of the insulated wire satisfies the relationship of formula (2).

$$1.0 > Sc/Sw \geq 0.8 \quad \text{Formula (2)}$$

(2) The insulated wire described in the above item (1), wherein a long side length c1 (mm) of the transverse section of the conductor is 4.5 mm or less, a short side length c2 (mm) of the transverse section of the conductor is 3.5 mm or less, and a curvature radius Rc (mm) of the transverse section of the conductor is 0.60 mm or less, and wherein the combination of t1 (μm) and c2 (mm) or the combination of t2 (μm) and c1 (mm) each satisfy the relationship of formula (3a) or (3b):

$$0 < t1/(c2 \times 1000) \leq 0.02 \quad \text{Formula (3a)}$$

$$0 < t2/(c1 \times 1000) \leq 0.02 \quad \text{Formula (3b)}$$

(3) The insulated wire described in the above item (1) or (2), wherein the thermoplastic resin is a crystalline resin and has a bending elastic modulus at 23° C. of 2,000 MPa or more.

(4) The insulated wire described in any one of the above items (1) to (3), wherein the thermoplastic resin is selected from the group consisting of a polyetheretherketone, a modified polyetheretherketone, a polyetherketoneketone, a polyetherketone, a polyetherketoneetherketoneketone, and a polyphenylene sulfide.

(5) A coil, produced by winding working the insulated wire described in any one of the above items (1) to (4).

(6) An electric or electronic equipment, comprising the coil described in the above item (5).

In the description of the present invention, any numerical expressions in a style of using " . . . to . . . " will be used to indicate a range including the lower and upper limits represented by the numerals given before and after "to", respectively.

Further, in the insulated wire of the present invention, the term "side" of a conductor means a portion of the side, except for a corner portion of the conductor having a curvature radius Rc.

Further, in the insulated wire of the present invention, the term "a corner portion of a conductor" means a curved portion of the conductor formed so as to have a curvature radius Rc.

Further, in the insulated wire of the present invention, the term "rectangular" means an approximate rectangle-shape having a curvature radius Rc at the corner portion.

In the insulated wire of the present invention, in a case where a long side length and a short side length are equal to each other, a pair of opposed sides is designated as a long side, and another pair of opposed sides is designated as a short side.

Advantageous Effects of Invention

The insulated wire of the present invention has a high space factor, and is also excellent in both edge-wise and flat-wise bending workability and dielectric breakdown strength after extension.

Further, in the coil of the present invention, occurrence of cracks in the insulating coat layer due to a bending working at the time of the winding working is prevented, because the insulated wire to be used is excellent in the edge-wise and flat-wise bending workability. Further, in the electrical equipment using the coil of the present invention, a space factor is high and the thickness of the insulating coat layer at the corner portion of the conductor does not get thin even after extension. Accordingly, the downsizing and enhancement of the performance of the electronic or electrical equipment become possible.

Other and further features and advantages of the invention will appear more fully from the following description, appropriately referring to the accompanying drawings.

MODE FOR CARRYING OUT THE INVENTION

Insulated Wire

An insulated wire of the present invention contains an insulating coat layer composed of a thermoplastic resin on the outer peripheral surface of a conductor having a rectangular cross-sectional shape and also having a long side, a short side, and a corner portion having a curvature radius Rc.

Further, in the insulated wire of the present invention, a thickness t1 (μm) of the insulating coat layer covered on the surface which is continuing in an axial direction of the conductor, and which layer includes a long side of the transverse section of the conductor (hereinafter, also called as a "long side thickness of the insulating coat layer"); a thickness t2 (μm) of the insulating coat layer covered on the surface which is continuing in the axial direction of the conductor, and which layer includes a short side of the transverse section of the conductor (hereinafter, also called as a "short side thickness of the insulating coat layer"); and a corner portion thickness t3 (μm) of the insulating coat layer, satisfy the relationship of formula (1).

$$t3/\{(t1+t2)/2\} \geq 1.2 \quad \text{Formula (1)}$$

In formula (1), t1 (μm) and t2 (μm) each independently designates 20 μm or more and 50 μm or less, and a ratio of a cross-sectional area Sc (mm²) of the conductor to a cross-sectional area Sw (mm²) of the insulated wire satisfies the relationship of formula (2).

$$1.0 > Sc/Sw \geq 0.8 \quad \text{Formula (2)}$$

In the present invention, in a case where layers which are the same in terms of a resin for forming the layers and additives to be added thereto have been adjacently laminated, these layers are collectively defined as one layer.

Further, in a case where even if layers are composed of the same resin, the layers which are different in a kind or a blend amount of the additive(s) have been laminated, these layers are defined as different layers, whether or not the layers are adjacently located.

Hereinafter, a preferable insulated wire of the present invention is described referring to the drawings, but the present invention is not limited thereto.

Figure 1:
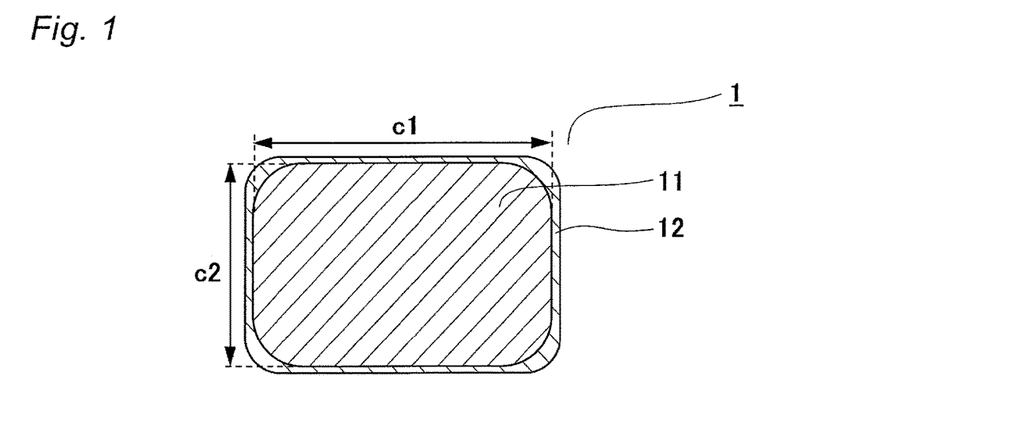
FIG. 1 is a schematic cross-sectional view showing a preferable embodiment of the insulated wire of the present invention.

The insulated wire 1 of a preferable embodiment of the present invention shown in the cross-sectional view of FIG. 1 has a conductor 11; and an insulating coat layer 12 provided on the outer periphery of the conductor 11. Further, as shown in the schematic view of FIG. 2, four corners of the conductor each have a corner portion having a curvature radius Rc, and the insulating coat layer 12 has a long side thickness t1 (μm), a short side thickness t2 (μm), and a corner portion thickness t3 (μm) in terms of the respective resin thickness. Herein, the corner portion of the insulating coat layer means a site of the insulating coat layer which coats the corner portion of the conductor.

Herein, the thickness of the insulating coat layer can be measured by a scanning electron microscope (SEM) or a commercially-available microscope and the like. The observation magnification may be determined appropriately depending on the thickness of the insulating coat layer. However, basically the magnification of 400 times or more is preferred.

It is preferred that t1 (μm) and t2 (μm) which are a long side thickness and a short side thickness of the insulating coat layer are each uniform. In a case where the long side thickness and the short side thickness of the insulating coat layer are each uniform, a point for measuring the t1 may be determined appropriately.

Note that, in a case where the layer has a variable thickness, the use of the average value is preferred. In this case, it is preferred to calculate an average of the values obtained by measuring 5 points or more at an equal interval.

Figure 2:
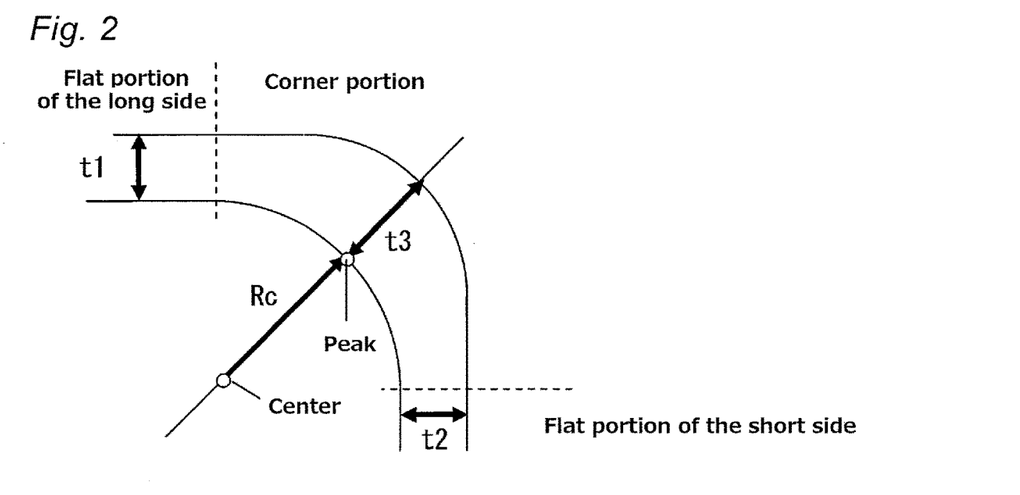
FIG. 2 is a schematic view showing a long side, a short side, and a corner portion of the insulated wire of the present invention.

Uniformity is not indispensable for the corner portion thickness t3 (μm) of the insulating coat layer. It is preferred that the apical thickness of the corner portion is maximized. The t3 (μm) in the present invention, as shown in FIG. 2, is defined as a thickness of the insulating coat layer in a straight line tying the center to the peak of the corner portion of the conductor In the insulated wire of the present invention, 2 long sides, 2 short sides, and 4 corner portions exist and therefore, in a case where thicknesses of the insulating coat layers in each set of the long sides, the short sides, and the corner portions are different from each other in the set, the respective average values are defined as t1 (μm), t2 (μm), and t3 (μm).

Further, the insulated wire, which is excellent in bending workability, and which is down-sizable at the time of the motor-shaping, can be obtained, by the following requirements: the corner portion thickness t3 (μm) of the insulating coat layer to the average thickness of a long side thickness t1 (μm) of the insulating coat layer and a short side thickness t2 (μm) of the insulating coat layer satisfies the relationship of formula (1).

$$t3/\{(t1+t2)/2\} \geq 1.2 \quad \text{Formula (1)}$$

In formula (1), t1 (μm) and t2 (μm) are each independently 20 μm or more and 50 μm or less; and a ratio of a cross-sectional area Sc (mm²) of the conductor 11 to a cross-sectional area Sw (mm²) of the insulated wire 1 shown in FIG. 1 satisfies the relationship of formula (2).

$$1.0 > Sc/Sw \geq 0.8 \quad \text{Formula (2)}$$

Figure 3:
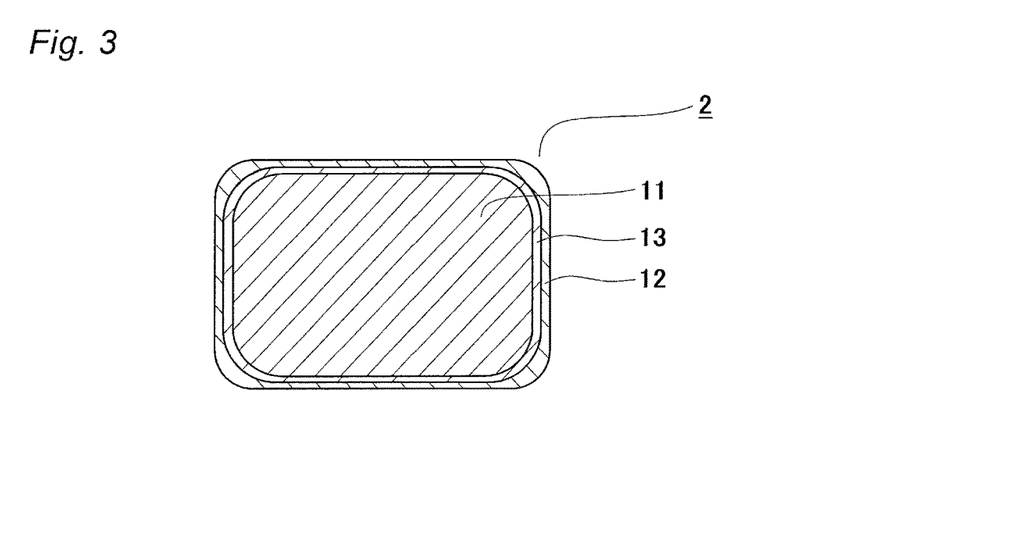
FIG. 3 is a schematic cross-sectional view showing another preferable embodiment of the insulated wire of the present invention.

The insulated wire 2 of another preferable embodiment of the present invention shown in the cross-sectional view of FIG. 3 has an inner layer 13 interposed between the conductor 11 and the insulating coat layer 12.

Note that, in the insulated wire 2, a total thickness of the insulating coat layer 12 and the inner layer 13 is defined as a long side thickness t1 (μm), a short side thickness t2 (μm), and a corner portion thickness t3 (μm), respectively of the insulating coat layer.

Hereinafter, the insulated wire of the present invention is described in order from a conductor.

Conductor

The conductor that can be used in the present invention has a rectangular cross-sectional shape (also called as "square (or rectangular)"), and has a corner portion having a curvature radius Rc As for the conductor that can be used in the present invention, a material thereof is not particularly limited, as long as it has electrical conductivity; and examples thereof include copper, a copper alloy, aluminum, an aluminum alloy, and the like, but the present invention is not limited to these materials.

In a case where the conductor is copper, for example, when the conductor is welded, from the viewpoint of preventing generation of void at the welding portion due to contained oxygen, preferably the copper has its content of 99.96% or more; and the copper is preferably a low-oxygen copper having an oxygen content of preferably 30 ppm or less, more preferably 20 ppm or less, or an oxygen-free copper.

In a case where the conductor is aluminum, from the viewpoint of a required mechanical strength, various aluminum alloys can be used according to the application. For example, for such a use as a rotating electrical machine, it is preferred using a 99.00% or more-grade pure aluminum by which a high current value can be obtained.

Since the conductor that can be used in the present invention is the conductor whose cross-sectional shape is rectangular, the rectangular conductor has higher space factor with respect to the stator slot, as compared to a round conductor.

In the point of suppressing a partial discharge from corner portions, the conductor that can be used in the present invention is shaped such that the conductor has chamfered portions (curvature radius R) at 4-corners, as shown in, for example, FIG. 2.

From the viewpoint of the space factor described below, the curvature radius Rc is preferably 0.60 mm or less, and more preferably in the range of 0.10 to 0.40 mm.

The size of the conductor is not particularly limited, because it should be determined in accordance with a use of the insulated wire or the coil. However, as the length of a side of the conductor cross-section, the width (long side) c1 is preferably 4.7 mm of less, more preferably from 1.0 mm to 4.7 mm, and furthermore preferably from 1.4 mm to 4.5 mm. The thickness (short side) c2 is preferably from 3.5 mm or less, more preferably from 0.4 mm to 3.0 mm, and furthermore preferably from 0.5 mm to 2.5 mm.

A cross-section rectangle is more common than a cross-section square.

Although the size of cross-section of the conductor is not particularly limited, but a length ratio of the width (long side) c1 and the thickness (short side) c2, is preferably from c1:c2=1:1 to 4:1.

Note that the long side length and the short side length of the conductor cross section that can be used in the present specification, correspond to a long side and a short side of the rectangle before the corner portion is chamfered.

Space Factor

The space factor in the present specification is a conductor space factor calculated by the following formula, and means a ratio of a cross-sectional area Sc ($mm^2$) of the conductor 11 to a cross-sectional area Sw ($mm^2$) of the insulated wire 1 or 2.

[Conductor space factor]=$Sc/Sw$

By enhancement of this conductor space factor, the space factor at the time of producing a coil is improved, so that a down-sizable motor with high performance can be produced.

Insulating Coat Layer

The insulated wire of the present invention has the insulating coat layer composed of a thermoplastic resin, on the outer periphery of the conductor.

Examples of the thermoplastic resin which can be used for the insulating coat layer in the insulated wire of the present invention include: commodity engineering plastics, such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh-molecular-weight polyethylene; and in addition, super-engineering plastics, such as polysulfone (PSF), polyether sulfone (PES), polyphenylene sulfide (PPS), polyarylate (U polymer), polyamideimide, polyetherketone (PEK), polyaryletherketone (PAEK) (including a modified polyetheretherketone (modified PEEK)), tetrafluoroethylene/ethylene copolymer (ETFE), polyetheretherketone (PEEK), tetrafluoroethylene/perfluoroalkylvinylether copolymer (PFA), polytetrafluoroethylene (PTFE), a thermoplastic polyimide resin (TPI), polyamideimide (PAI), and a liquid crystalline polyester; and further polymer alloys containing the foregoing engineering plastics, such as a polymer alloy composed of polyethylene terephthalate (PET) or polyethylene naphthalate (PEN) as a base resin, ABS/polycarbonate, NYLON 6,6, aromatic polyamide resin (aromatic PA), polyphenylene ether/NYLON 6,6, polyphenylene ether/polystyrene, and polybutylene terephthalate/polycarbonate.

Among those resins, as a crystalline thermoplastic resin, examples preferably include: commodity engineering plastics, such as polyamide (PA), polyacetal (POM), polybutylene terephthalate (PBT), polyethylene terephthalate (PET), polyphenylene sulfide (PPS), ultrahigh-molecular-weight polyethylene; and polyetheretherketone (PEEK), polyetherketone (PEK), polyaryletherketone (PAEK) (including a modified PEEK), polyetherketoneketone (PEKK), polyetherketoneetherketoneketone (PEKEKK), and thermoplastic polyimide resin (TPI).

Among those resins, a resin selected from the group consisting of PEEK, a modified PEEK, PEKK, PEK, PEKEKK, and PPS is preferable, a resin selected from the group consisting of PEEK, a modified PEKK, PEK, and PEKEKK is more preferable, and PEEK or a modified PEKK is furthermore preferable. These thermoplastic resins may be used singly or in combination thereof. Further, it is needless to say that the resin to be used is not limited by the above-described resin names, and resins other than those recited above also can be used, as long as they are superior in performance to those resins.

Specific example include polyetheretherketone (PEEK, bending elastic modulus at 23° C.: 3,500 to 4,500 MPa), a modified PEKK (modified PEEK, bending elastic modulus at 23° C.: 2,800 to 4,400 MPa), polyetherketoneketone (PEKK, bending elastic modulus at 23° C.: 3,800 to 4,500 MPa), polyetherketone (PEK, bending elastic modulus at 23° C.: 4,000 to 5,000 MPa), polyetherketoneetherketoneketone (PEKEKK, bending elastic modulus at 23° C.: 4,000 to 4,600 MPa), thermoplastic polyimide resin (TPI, bending elastic modulus at 23° C.: 2,500 to 3,000 MPa), and polyphenylene sulfide (PPS, bending elastic modulus at 23° C.: 3,500 to 4,200 MPa).

In a case where a bending elastic modulus at 23° C. is less than 1,000 MPa, a deformation effect becomes higher.

In a case where a bending elastic modulus at 23° C. is 800 MPa or more, further abrasion-resistant characteristics can be maintained to a good level without deteriorating a shape-changeable ability of the thermoplastic resin.

The bending elastic modulus at 23° C. of the thermoplastic resin is preferably 2,000 MPa or more, more preferably 3,000 MPa or more, and furthermore preferably 3,500 MPa or more.

The upper limit of the bending elastic modulus is not particularly limited. Note that, in a case of interposing the inner layer formed by baking a varnish composed of the thermosetting resin between the conductor and the insulating coat layer, a bending elastic modulus at 23° C. of the thermoplastic resin for forming the insulating coat layer is preferably 5,000 MPa or less, from the points that a concentration of the stress to the outside thermoplastic resin is prevented, which allows suppression of occurrence of cracks due to edge-wise bending, as long as the bending elastic modulus at 23° C. of the thermoplastic resin for forming the insulating coat layer does not largely exceed a bending elastic modulus at 23° C. of the thermosetting resin for forming the inner layer.

Thus, it is preferable that the thermoplastic resin that can be used in the present invention is a crystalline thermoplastic resin having a bending elastic modulus at 23° C. of 2,000 MPa or more.

Specific examples of the thermoplastic resin include: commercially available products, such as PEEK450G manufactured by Victrex Japan Inc. (trade name, bending elastic modulus at 23° C.: 4,200 MPa) as the PEEK; AVASPIRE AV-650 manufactured by Solvay Co. (trade name, bending elastic modulus at 23° C.: 3,700 MPa) or AV-651 (trade name, bending elastic modulus at 23° C.: 3,100 MPa) as the modified PEEK; PEKK manufactured by Cytec Industries Inc. (bending elastic modulus at 23° C.: 4,500 MPa) as the PEKK; HT-G22 manufactured by Victrex Japan Inc. (trade name, bending elastic modulus at 23° C.: 4,200 MPa) as the PEK; ST-STG45 manufactured by Victrex Japan Inc. (trade name, bending elastic modulus at 23° C.: 4,100 MPa) as the PEKEKK; AURUM PL 450C manufactured by Mitsui Chemicals, Inc. (trade name, bending elastic modulus at 23° C.: 2,900 MPa) as the TPI; and DURAFIDE 0220A9 manufactured by Polyplastics Co., Ltd. (trade name, bending elastic modulus at 23° C.: 3,800 MPa), or PPS FZ-2100 manufactured by DIC Corporation (trade name, bending elastic modulus at 23° C.: 3,800 MPa) as the PPS.

Further, regarding the insulating coat layer in the present invention, a long side thickness $t1$ of the insulating coat layer, a short side thickness $t2$ of the insulating coat layer, and a corner portion thickness $t3$ of the insulating coat layer, satisfy the relationship of formula (1):

$$t3/\{(t1+t2)/2\} \geq 1.2 \qquad \text{Formula (1)}$$

By satisfying the relationship of formula (1), a dielectric breakdown voltage of the insulated wire after extension can be maintained.

Note that, although the mechanism is not known accurately, by an observation of the sectional shapes before and after extension, such a phenomenon has been found that a thin portion in terms of a film thickness of the insulating coat layer becomes further thinner, and based on this finding, it is presumed that the film thickness of the insulating coat layer at the corner portion which is most subjected to an electric field concentration is maintained even after extension, whereby a dielectric breakdown voltage after extension has been maintained.

From the viewpoint of suppressing lowering of the film thickness due to extension, the value of the left side: $t3/\{(t1+t2)/2\}$ in formula (1) is 1.2 or more, preferably 1.5 or more, more preferably 1.8 or more, and still more preferably 2.1 or more. Note that, the upper limit thereof is preferably 2.5 or less, from the point of ease of alignment when set in a motor, due to a shape of the insulating coat layer.

Further, the long side thickness $t1$ and the short side thickness $t2$ of the insulating coat layer in the present invention are each independently 20 μm or more and 50 μm or less, preferably 25 μm or more and 40 μm or less, and further more preferably 25 μm or more and 35 μm or less.

Note that, in a case where $t1$ and $t2$ each have variable thickness, a difference in thickness between the minimum value and the maximum value in each case is preferably 10 μm or less, more preferably 5 μm or less, and still more preferably 3 μm or less.

By setting the long side thickness and the short side thickness of the insulating coat layer to the foregoing range, it can be obtained an insulated wire having a thin insulating coat layer and a high space factor.

In addition, the long side thickness $t1$ and the short side thickness $t2$ of the insulating coat layer preferably satisfy the relationships represented by formulae (1a) and (1b).

$$0 \leq |t1-t2|/t1 \leq 0.2 \qquad \text{Formula (1a)}$$

$$0 \leq |t1-t2|/t2 \leq 0.2 \qquad \text{Formula (1b)}$$

By satisfying the relationships of formulae (1a) and (1b), a film thickness of the insulating coat layer on the corner portion at the time of extension of the insulated wire is maintained effectively, whereby a dielectric breakdown voltage after extension is maintained.

The insulating coat layer in the present invention is preferably provided by extrusion-coating a thermoplastic resin on the outer periphery of the conductor.

By providing a thermoplastic resin according to the extrusion-coating, the thickness of the insulating coat layer can be controlled arbitrarily, so that the thickness $t1$, the thickness $t2$, and the thickness $t3$ of the insulating coat layer satisfies the relationship of formula (1). Note that the thermoplastic resin also can be provided, by coating and baking a varnish thereof like a thermosetting resin described below.

Regarding the insulated wire of the present invention, a single layer of the insulating coat layer in the present invention is preferably provided on the outer periphery of the conductor.

The conventional insulated wire is required to interpose an enamel layer between a conductor and an insulating coat layer, in order to improve in both adhesion force and dielectric breakdown voltage after extension. However, in the present invention, by setting the long side thickness $t1$, the short side thickness $t2$, and the corner portion thickness $t3$ of the insulating coat layer to satisfy the relationship of formula (1), the insulated wire having good adhesion force even if a strong working pressure is put thereon and also dielectric breakdown voltage after extension is obtained, without having to provide the enamel layer.

By skipping (omitting) the step of providing the enamel layer on the conductor, the process of producing the insulated wire can be simplified. Therefore, the insulated wire 1 shown in FIG. 1, which has a single layer of the insulating coat layer directly provided on the outer periphery of the conductor, is more preferred.

Relationship of Conductor and Insulating Coat Layer

In the present invention, a ratio of the cross-sectional area Sc of the conductor to the cross-sectional area Sw of the insulated wire satisfies the relationship of formula (2).

$$1.0 > Sc/Sw \geq 0.8 \qquad \text{Formula (2)}$$

Note that the cross section area Sc of the conductor and the cross section area Sw of the insulated wire can be measured, by a scanning electronic microscope (SEM) or a commercially available microscope and the like. The observation magnification may be determined appropriately depending on the thickness of the insulating coat layer. However, regarding the cross section area Sw of the insulated wire, basically the magnification of 400 times or more is preferred.

By satisfying the relationship of formula (2), an insulated wire having a high space factor can be obtained. From the viewpoint of obtaining efficiency-enhancing effects of a better motor, a lower limit of Sc/Sw is preferably 0.85 or more, and more preferably 0.90 or more.

It is also preferable that a long side length c1 (mm) of the conductor cross section and a short side length c2 (mm) of the conductor cross section as well as a long side thickness $t1$ (μm) of the insulating coat layer and a short side thickness $t2$ (μm) of the insulating coat layer each satisfy the relationships of formulae (3a) and (3b).

$$0 < t1/(c2 \times 1000) \leq 0.02 \qquad \text{Formula (3a)}$$

$$0 < t2/(c1 \times 1000) \leq 0.02 \qquad \text{Formula (3b)}$$

By satisfying the relationships of formulae (3a) and (3b), an insulated wire can be obtained, which has excellent edge-wise bending workability and excellent flat-wise bending workability.

Note that, from the viewpoint of obtaining better edge-wise and flat-wise bending workability, it is more preferable that the relationships of formulae (3a) and (3b) are satisfied; and also a long side length c1 of the conductor cross section is 4.5 mm or less, a short side length c2 of the conductor cross section is 3.5 mm or less, and a curvature radius Rc is 0.60 mm or less.

In a case where 2 or more kinds of thermoplastic resins are used in mixture, for example, they may be used as a compatible and uniform mixture in which they have been polymer-alloyed, or alternatively they may be used, by modifying a non-compatible blend into a compatible state with a compatibilizer.

In the present invention, any of various additives described below may be incorporated into a material for obtaining the insulating coat layer, to the extent that the characteristics are not affected adversely.

Inner Layer (C)

In the present invention, the inner layer which may be interposed between the conductor and the insulating coat layer is not particularly limited, as long as the inner layer has a good bending workability while maintaining a dielectric breakdown voltage after extension. Examples of the inner layer include an enamel-baked layer.

From the viewpoint of obtaining the characteristics of the present invention, namely a high space factor, maintenance of the dielectric breakdown voltage after extension, and a good bending resistance, without making any change to the relative dielectric constant of the insured wire, a thickness of the inner layer is preferably 5 μm or less, more preferably 3 μm or less, and still more preferably 2 μm or less.

The enamel-baked layer is formed, by coating and baking a resin varnish on the conductor. The resin varnish to be used contains a thermosetting resin.

The thermosetting resin is not particularly limited, as long as it is a thermosetting resin capable of forming an insulating film by coating and baking it on the conductor. As the thermosetting resin, use can be made, for example, of: polyimide (PI), polyurethane, polyamideimide (PAI), thermosetting polyester, Class H polyester, polybenzoimidazole, polyesterimide (PEsI), polyetherimide (PEI), a melamine resin, an epoxy resin, and the like.

In the present invention, as the thermosetting resin, it is preferable to use any of thermosetting resins selected from the group consisting of polyimide, polyamideimide, polyetherimide, and polyesterimide.

The polyimide is not particularly limited, but use may be made of: any of usual polyimides, such as a whole aromatic polyimide and a thermosetting aromatic polyimide. For example, use may be made of a commercially available product (for example, trade name, U IMIDE, manufactured by Unitika Ltd.; and trade name, U-VARNISH, manufactured by Ube Industries, Ltd.), or use may be made of a polyimide obtained by a usual method in which an aromatic tetracarboxylic dianhydride and an aromatic diamine are subjected to reaction in a polar solvent to obtain a polyamic acid solution, and then the thus-obtained polyamic acid solution is subjected to imidization by a thermal treatment at the time of baking in formation of the coating.

Regarding the polyamideimide, it is not particularly limited as long as it is thermosetting, use may be made of a commercially available product (for example, trade name, HI406, manufactured by Hitachi Chemical Co., Ltd., and trade name, HCl-series, manufactured by Hitachi Chemical Co., Ltd.), or use may be made of a polyamideimide obtained by a usual method, for example, a method in which a tricarboxylic anhydride and a diisocyanate are subjected to direct reaction in a polar solvent, or a method in which a diamine is subjected to reaction with a tricarboxylic anhydride in a polar solvent, to previously introduce an imide bond into the reaction product, and then the resultant reaction product is subjected to amidation using a diisocyanate. Note that the polyamideimide has the property of a lower thermal conductivity and a higher dielectric breakdown voltage than other resins, and also has bake-hardenability.

Use may be made of the polyetherimide having an ether bond and an imide bond in the molecule. Example of the polyetherimide include: commercially available products, such as ULTEM 1000, trade name, manufactured by SABIC.

Further, use may also be made of any of the polyetherimides, for example, by obtaining in which an aromatic tetracarboxylic dianhydride and an aromatic diamine having an ether bond in the molecule are subjected to reaction in a polar solvent, to obtain a polyamic acid solution, and then the thus-obtained polyamic acid solution is subjected to imidization by a thermal treatment at the time of baking in formation of the coating.

Regarding the polyesterimide, it is not particularly limited as long as it is thermosetting polymer having an ester bond and an imide bond in its molecule; and, for example, use may be made of a commercially available product, such as NEOHEAT 8600 A (trade name, manufactured by Totoku Toryo Co., Ltd.).

Further, the polyesterimide is not particularly limited, but, for example, use may be made of any of those obtained by forming an imide bond from a tricarboxylic acid anhydride and an amine, and forming an ester bond from an alcohol and a carboxylic acid or an alkyl ester thereof, and then by participation of a free acid group or an anhydride group of the imide bond in an ester-forming reaction. Regarding the foregoing polyesterimide, for example, use may be also made of those obtained by reacting a tricarboxylic acid anhydride, a dicarboxylic acid compound or an alkyl ester thereof, an alcohol compound, and a diamine compound in accordance with a known method.

These thermosetting resins may be used singly, or in combination of two or more kinds of those.

Further, in a case where the thermosetting resin coat (layers) is (or are) composed of a plurality of thermosetting resin layers, use may be made of thermosetting resins, which are different from each other in each layer; or alternatively use may be made of thermosetting resins, whose mixing ratio of the thermosetting resins which is different from each other in each layer.

Any of various additives, such as a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, may be incorporated into the resin varnish that can be used in the present invention, to the extent that the characteristics are not affected adversely. Furthermore, a layer formed from a resin containing any of these additives may be laminated on the resulting insulated wire, or alternatively the insulated wire may be coated with a coating material containing any of these additives.

A powder having a high aspect ratio, such as a glass fiber and a carbon nanotube, may be added to the coating material of the resin varnish and baked, in order to improve the elastic modulus of the thermosetting resin layer. By addition of such a powder, the powder is aligned in the flow direction of the wire at the working, so that the wire is strengthened in the bend direction.

The resin varnish contains such an organic solvent, which makes the thermosetting resin varnish. The organic solvent is not particularly limited as long as the organic solvent does not inhibit the reaction of the thermosetting resin; and examples thereof include: amide-based solvents, such as N-methyl-2-pyrrolidone (NMP), N,N-dimethylacetamide (DMAC), and N,N-dimethylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

Among these, in view of high solubility, high reaction promotion property, or the like, an amide-based solvent or an urea-based solvent is preferred; in view of having no hydrogen atom that is apt to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is more preferred; and N,N-dimethylacetamide, N-methyl-2-pyrrolidone, N,N-dimethylformamide, and dimethylsulfoxide are particularly preferred.

These organic solvents may be used singly, or in combination of two or more kinds of those.

Property of Insulated Wire

The insulated wire of the present invention is excellent in space factor, edge-wise and flat-wise bending workability, and maintenance property of the dielectric breakdown voltage after extension.

Space Factor

The space factor is evaluated by a conductor space factor, which means a ratio of a cross section area Sc (mm$^2$) of the conductor 11 to a cross section area Sw (mm$^2$) of the insulated wire 1 or 2.

Evaluation is conducted on the following 4-point scale: the insulated wire having a conductor space factor of 0.90 or more and less than 1.00 is indicated by criterion "A" as having a large effect on improvement in efficiency of the motor;
the insulated wire having a conductor space factor of 0.85 or more and less than 0.90 is indicated by criterion "B" as having such an effect;
the insulated wire having a conductor space factor of 0.80 or more and less than 0.85 is indicated by criterion "C" as having such an effect although it is not very effective; and
the insulated wire having a conductor space factor of less than 0.80 is indicated by criterion "D" as having almost no superiority when compared to the insulated wire having a conductor whose cross sectional shape is circle. At least the criterion "C", as well as the criteria "A" and "B", is an acceptable level.

Edge-Wise Bending Property

The edge-wise bending test is carried out in accordance with JIS 3216-3.

Meanwhile, in order to impose more strict condition on the insulated wire, the edge-wise bending test is carried out by making a 5 μm-deep incision in the portion to be bent of the insulated wire using a feather razor S single-edged razor blade (for example, manufactured by FEATHER Safety Razor Co., Ltd.). The incised insulated wire is wound around a φ 1.5 mm (diameter) stainless steel rod, so that the incision portion would be a center of the insulated wire, followed by bending, for evaluation.

Evaluation is conducted on the following 3-point scale: the insulated wire, in which the insulating coat layer cracks and the crack develops to the whole surface of the conductor is indicated by the criterion "D"; the insulated wire, in which the insulating coat layer cracks and the crack develops, but does not reach to the conductor is indicated by the criterion "C"; and
the insulated wire, in which the incision has not been developed by the accompanied extension of the incision portion is indicated by the criterion "B". At least the criterion "C", as well as the criterion "B", is an acceptable level.

Flat-Wise Bending Property

The flat-wise bending test is carried out, by applying the edge-wise bending property test.

Meanwhile, in order to impose more strict condition in the flat-wise bending, the flat-wise bending test is carried out by making a 5 μm-deep incision in the portion to be bent of the insulated wire using a feather razor S single-edged razor blade (for example, manufactured by FEATHER Safety Razor Co., Ltd.). The incised insulated wire is wound around a φ 1.5 mm stainless steel rod, so that the incision portion would be a center of the insulated wire, followed by bending, for evaluation.

Evaluation is conducted on the following 3-point scale: the insulated wire, in which the insulating coat layer cracks and the crack develops to the whole surface of the conductor is indicated by the criterion "D"; the insulated wire, in which the insulating coat layer cracks and the crack develops, but does not reach to the conductor is indicated by the criterion "C"; and
the insulated wire, in which the incision has not been developed by the accompanied extension of the incision portion is indicated by the criterion "B". At least the criterion "C", as well as the criterion "B", is an acceptable level.

Dielectric Breakdown Strength after Elongation

The withstand voltage characteristics of the insulated wire is evaluated, by extending the insulated wire as long as 20% at the extension rate of 300 mm/min using an autograph (for example, manufactured by Shimadzu Corporation), and then measuring a voltage using a dielectric breakdown tester.

Specifically, a ground-side electrode is connected to the portion in which a terminal on one side of the insulated wire is peeled off, and an aluminum foil is wrapped up around the portion at the length of 300 mm from the end of the insulated wire whose terminal is peeled off, and then a high-voltage side electrode is connected to the wrapped aluminum foil. Allowing a voltage rising at the voltage rising rate of 500 V/second, the voltage at the time when an electric current of 15 mA or more flows is red off. The test is carried out repeatedly at the number of times: n=5. The dielectric breakdown voltage is evaluated by its average value. The dielectric breakdown strength is calculated by dividing this average value with an average value of "a total film thickness of the long side" and "a film thickness of the short side".

Evaluation is conducted on the following 4-point scale: the dielectric breakdown strength of 100 V/μm or more is indicated by the criterion "A";
the dielectric breakdown strength of 80 V/μm or more and less than 100 V/μm is indicated by the criterion "B";
the dielectric breakdown strength of 60 V/μm or more and less than 80 V/μm is indicated by the criterion "C"; and
the dielectric breakdown strength of less than 60 V/μm is indicated by the criterion "D". The criteria equal to or more than "C", as well as the criteria "A" and "B", is acceptable.

Method of Producing an Insulated Wire

The insulated wire of the present invention can be produced, by forming the insulating coat layer composed of the thermoplastic resin, on the outer periphery of the conductor.

Meanwhile, in a case of interposing the inner layer between the conductor and the insulating coat layer, the insulated wire of the present invention can be produced, by providing the inner layer on the conductor, followed by forming the insulating coat layer thereon.

Hereinafter, the inner layer and the insulating coat layer are described in this order.

The inner layer is formed, for example, by coating and baking the resin varnish containing the thermosetting resin on the conductor. The method of coating the resin varnish may be in a usual manner. Examples of the coating method include: a method of employing a die for varnish-coating, which has been manufactured so as to be similar to the shape of the conductor; and a method of employing a die that is called "universal die", which has been formed in a curb shape when the cross-section shape of the conductor is quadrangular.

The conductor having the varnish of any of these resins coated thereon is baked by a baking furnace, in a usual manner. Although specific baking conditions depend on the shape of the furnace to be used, if the furnace is an about 8 m-sized vertical furnace by natural convection, the baking can be achieved, by setting the passing time period to 10 to 90 sec at the furnace inside temperature of 400 to 650° C.

The baking of the resin varnish may be performed once or with a plurality of repeats. In a case of a plurality of repeats, the baking condition may be the same or different from each other.

In this way, a single inner layer can be formed. In a case of forming a plurality of inner layers, which may be done by changing a resin varnish to be used.

Next, the insulating coat layer composed of the thermoplastic resin is provided, on the outer periphery of the conductor on which the inner layer has been formed. For example, the insulated wire can be obtained, by using the conductor on which the inner layer is formed (also referred to as an enamel wire) as a core wire, and then by forming the insulating coat layer by extrusion-coating the thermoplastic resin on the enamel wire using a screw of the extruder. On this occasion, extrusion-coat of the thermoplastic resin is performed, using an extrusion die at a temperature of a melting point or higher of the thermoplastic resin (in a case of non-crystalline resin, a glass transition temperature or higher), so that the cross sectional outer shape of the extrusion-coat resin layer ends up with a form, which is similar to the shape of the conductor, and also the form, in which a predetermined thickness of each of the long side, the short side, and the corner portion can be obtained. The thermoplastic resin layer (for example, the insulating coat layer composed of the thermoplastic resin) may be also formed, by using an organic solvent or the like and the thermoplastic resin.

In a case of using a non-crystalline thermoplastic resin, the thermoplastic resin layer may be also formed by, other than the extrusion-molding, coating and baking a varnish of the thermoplastic resin dissolved in an organic solvent or the like on an enamel wire, using a die similar to the shape of the conductor.

As an organic solvent for the varnish, the organic solvents described in the resin varnish are preferable.

Further, specific baking conditions depend on a shape of the furnace to be used. However, the conditions described for those of the thermosetting resin are preferable.

The insulated wire of the present invention is applicable to a field which requires resistance to high voltage and resistance to bending property, such as various kinds of electric equipment. For example, the insulated wire of the present invention is used for a motor, a transformer, and the like, which can be composed of high-performance electric equipment. The insulated wire of the present invention is preferably used for any of a distributed winding coil used in a high voltage region and a concentrated winding coil used in a low or medium voltage region, and particularly preferably used for the concentrated winding coil. Specifically, the insulated wire of the present invention is preferably used as winding for a driving motor of HV and EV.

EXAMPLES

The present invention will be described in more detail based on examples given below, but the invention is not meant to be limited by these.

Example 1

In Example 1, an insulated wire 1 shown in FIG. 1 was prepared.

As the conductor, use was made of a cross-section rectangular (long side c1: 3.2 mm×short side c2: 1.7 mm, curvature radius Rc of chamfered edge at four corners=0.3 mm) rectangular conductor 11 (copper having an oxygen content of 15 ppm).

Use was made of a screw of the extruder specified by 30 mm full flight, L/D=20, and compression ratio 3.

By using a polyetheretherketone resin (PEEK) (trade name: PEEK450G, manufactured by Victrex Japan Inc., bending elastic modulus at 23° C.: 4,200 MPa) as the thermoplastic resin, and performing extrusion-coat of PEEK at 370° C. using an extrusion die, so that the cross sectional outer shape of the insulating coat layer ended up with a form, which was similar to the shape of the conductor, and also a form, in which a thickness of each of the long side, the short side, and the corner portion shown in Table 1 was able to obtain, and an insulated wire 1 was obtained, which was composed of the PEEK extrusion-coat resin layer, on the outer periphery of the conductor, by forming the insulating coat layer 12 [extrusion-coat resin layer] having 30 μm of each of the long side thickness t1 and the short side thickness t2, 40 μm of each of the respective four corner portion thickness t3, and 0.3 mm of a curvature radius.

Example 2

In Example 2, an insulated wire 2 shown in FIG. 3 was prepared.

As the conductor, use was made of a cross-section rectangular (long side c1: 4.5 mm×short side c2: 1.8 mm, curvature radius Rc of chamfered edge at four corners=0.3 mm) rectangular conductor 11 (copper having an oxygen content of 15 ppm).

On the occasion of forming the inner layer 13, by using a die similar to the shape of the inner layer to be formed on the conductor 11, and coating a polyamideimide resin (PAI) varnish (trade name: HI406, manufactured by Hitachi Chemical Co., Ltd.) on the conductor 11, and then passing it through a 8 m-long baking furnace at a temperature in the furnace of 550° C. at the speed of 15 seconds of the transit time period, and thereby forming the 3 μm-thick inner layer 13, an enamel wire was obtained, which had the inner layer 13.

The thus-obtained enamel wire was used as a core wire, and use was made of a screw of the extruder specified by 30 mm full flight, L/D=20, and compression ratio 3.

By using a modified polyetheretherketone resin (modified PEEK) (trade name: AVASPIRE AV-650, manufactured by Solvay Japan Co.) as the thermoplastic resin, and performing extrusion-coat of the modified PEEK at 370° C. using an extrusion die, so that the cross sectional outer shape of the insulating coat layer ended up with a form, which was similar to the shape of the conductor, and also a form, in which a thickness of each of the long side, the short side, and the corner portion shown in Table 1 was able to obtain, and an insulated wire 2 was obtained, which was composed of the modified PEEK extrusion-coat resin layer, on the outer periphery of the conductor, by forming the insulating coat layer 12 [extrusion-coat resin layer] having 36 μm of the long side thickness, 34 μm of the short side thickness, 50 μm of each of the respective four corner portion thickness, and 0.3 mm of a curvature radius.

Example 3

In Example 3, an insulated wire 2 shown in FIG. 3 was prepared.

As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming a 3 μm-thick inner layer 13 in the same manner as in Example 2, except that a polyimide resin (PI) varnish (trade name: U IMIDE, manufactured by Unitika Ltd.) was used in place of the polyamideimide resin (PAI) varnish, an enamel wire was obtained, which had the inner layer 13.

By using the thus-obtained enamel wire as a core wire, and forming the insulating coat layer 12 having the thickness of each of the long side, the short side, and the corner portion, and the curvature radius Rr, shown in Table 1, in the same manner as in Example 2, except that a polyetheretherketone resin (PEEK) (trade name: PEEK450G, manufactured by Victrex Japan Inc.) was used in place of the modified polyetheretherketone resin (modified PEEK), an insulated wire 2 was obtained, which was composed of the PEEK extrusion-coat resin layer.

Example 4

In Example 4, an insulated wire 1 shown in FIG. 1 was prepared. As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming the insulating coat layer 12 having the thickness of each of the long side, the short side, and the corner portion, and the curvature radius Rr, shown in Table 1, in the same manner as in Example 1, except that a polyetherketone resin (PEK) (trade name: HT-G22, manufactured by Victrex Japan Inc.) was used in place of the polyetheretherketone resin (PEEK), an insulated wire 1 was obtained, which was composed of the PEK extrusion-coat resin layer.

Example 5

In Example 5, an insulated wire 2 shown in FIG. 3 was prepared.

As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming the 2 μm-thick inner layer 13 in the same manner as in Example 2, except that a polyetherimide resin (PEI) varnish (trade name: ULTEM 1000, manufactured by SABIC) was used in place of the polyamideimide resin (PAI) varnish, an enamel wire was obtained, which had the inner layer 13.

By using the thus-obtained enamel wire as a core wire, and forming the insulating coat layer 12 having the thickness of each of the long side, the short side, and the corner portion, and the curvature radius Rr, shown in Table 1, in the same manner as in Example 2, except that a thermoplastic polyimide resin (TPI) (trade name: AURUM PL 450C, manufactured by Mitsui Chemicals, Inc.) was used in place of the modified polyetheretherketone resin (modified PEEK), an insulated wire 2 was obtained, which was composed of the TPI extrusion-coat resin layer.

Example 6

In Example 6, an insulated wire 2 shown in FIG. 3 was prepared.

As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming the 3 μm-thick inner layer 13 in the same manner as in Example 2, except that a polyesterimide resin (PEsI) varnish (trade name: NEOHEAT 8600 A, manufactured by Totoku Toryo Co., Ltd.) was used in place of the polyamideimide resin (PAI) varnish, an enamel wire was obtained, which had the inner layer 13.

By using the thus-obtained enamel wire as a core wire, and forming the insulating coat layer 12 having the thickness of each of the long side, the short side, and the corner portion, and the curvature radius Rr, shown in Table 1, in the same manner as in Example 2, except that an aromatic polyamide resin (aromatic PA) (trade name: AMODE AT-1001L, manufactured by Solvay Co.) was used in place of the modified polyetheretherketone resin (modified PEEK), an insulated wire 2 was obtained, which was composed of the aromatic PA extrusion-coat resin layer.

Example 7

In Example 7, an insulated wire 1 shown in FIG. 1 was prepared. As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming the insulating coat layer 12 having the thickness of each of the long side, the short side, and the corner portion, and the curvature radius Rr, shown in Table 1, in the same manner as in Example 1, except that a modified polyetheretherketone resin (modified PEEK) (trade name: AVASPIRE AV-650, manufactured by Solvay Japan Co.) was used in place of the polyetheretherketone resin (PEEK), an insulated wire 1 was obtained, which was composed of the modified PEEK extrusion-coat resin layer.

Example 8

In Example 8, an insulated wire 1 shown in FIG. 1 was prepared.

As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming the insulating coat layer 12 having the thickness of each of the long side, the short side, and the corner portion, and the curvature radius Rr, shown in Table 1, in the same manner as in Example 1, except that a polyethylene terephthalate resin (PET) (trade name: TR8550N, manufactured by TEIJIN LIMITED) was used in place of the polyetheretherketone resin (PEEK), an insulated wire 1 was obtained, which was composed of the PET extrusion-coat resin layer.

Example 9

In Example 9, an insulated wire 1 shown in FIG. 1 was prepared.

As the conductor 11, use was made of a rectangular conductor 11 (copper having an oxygen content of 15 ppm) having the long side c1 thickness, the short side c2 thickness, and the curvature radius Rc of the corner portion, as shown in Table 1.

By forming the insulating coat layer 12 having the thickness of each of the long side, the short side, and the corner portion, and the curvature radius Rr, shown in Table 1, in the same manner as in Example 1, except that a polyphenylene sulfide resin (PPS) (trade name: PPS FZ-2100, manufactured by DIC Corporation) was used in place of the polyetheretherketone resin (PEEK), an insulated wire 1 was obtained, which was composed of the PPS extrusion-coat resin layer.

Comparative Example 1

In Comparative Example 1, an insulated wire having the same structure as the insulated wire 2 shown in FIG. 3 was produced, except that the thickness of each of the long side and the short side and the thickness of the corner portion of the insulating coat layer were equal to each other, and that the insulated wire did not satisfy the relationship of formula (1).

As the conductor, use was made of a rectangular conductor (copper having an oxygen content of 15 ppm) having the long side thickness, the short side thickness, and the curvature radius of the corner portion, as shown in Table 2.

By forming a 3 μm-thick inner layer in the same manner as in Example 2, an enamel wire was obtained, which had the inner layer.

By using the thus-obtained enamel wire as a core wire, and forming the insulating coat layer having the thickness of each of the long side, the short side and, and the corner portion, and the curvature radius Rr, shown in Table 2, in the same manner as in Example 2, except that a polyetheretherketone resin (PEEK) (trade name: PEEK450G, manufactured by Victrex Japan Inc.) was used in place of the modified polyetheretherketone resin (modified PEEK), an insulated wire was obtained, which did not satisfy the relationship represented by formula (1).

Comparative Example 2

In Comparative Example 2, an insulated wire having the same structure as the insulated wire 1 shown in FIG. 1 was produced, except that the thickness of each of the long side and the short side and the thickness of the corner portion of the insulating coat layer did not satisfy the relationship of formula (1), that the thickness of each of the long side and the short side of the insulating coat layer was too thick, and that the ratio of the cross-sectional area of the conductor to the cross-sectional area of the insulated wire did not satisfy the relationship of formula (2).

As the conductor, use was made of a rectangular conductor (copper having an oxygen content of 15 ppm) having the long side thickness and the short side thickness, and the curvature radius of the corner portion, as shown in Table 2.

By forming the insulating coat layer having the thickness of each of the long side, the short side, and the corner portion, and the curvature radius Rr, shown in Table 2, in the same manner as in Example 1, except that a modified polyetheretherketone resin (modified PEEK) (trade name: AVASPIRE AV-650, manufactured by Solvay Japan Co.) was used in place of the polyetheretherketone resin (PEEK), an insulated wire was obtained, which did not satisfy the relationships represented by formulae (1) and (2), and whose insulating coat layer was too thick in the long side thickness and the short side thickness.

Comparative Example 3

In Comparative Example 3, an insulated wire having the same structure as the insulated wire 1 shown in FIG. 1 was produced, except that the thickness of each of the long side and the short side, and the thickness of the corner portion of the insulating coat layer did not satisfy the relationship of formula (1).

As the conductor, use was made of a rectangular conductor (copper having an oxygen content of 15 ppm) having the long side thickness and the short side thickness, and the curvature radius of the corner portion, as shown in Table 2.

By forming the insulating coat layer having the thickness of each of the long side, the short side, and the corner portion, and the curvature radius Rr, shown in Table 2, in the same manner as in Example 1, except that a polyphenylene sulfide resin (PPS) (trade name: PPS FZ-2100, manufactured by DIC Corporation) was used in place of the polyetheretherketone resin (PEEK), an insulated wire was obtained, which did not satisfy the relationship represented by formula (1).

Comparative Example 4

In Comparative Example 4, an insulated wire having the same structure as the insulated wire 1 shown in FIG. 1 was produced, except that the ratio of the sectional area of the conductors to the sectional area of the insulated wire did not satisfy the relationship of formula (2).

As the conductor, use was made of a rectangular conductor (copper having an oxygen content of 15 ppm) having the long side thickness and the short side thickness, and the curvature radius of the corner portion, as shown in Table 2.

By forming the insulating coat layer having the thickness of each of the long side, the short side, and the corner portion, and the curvature radius Rr, shown in Table 2, in the same manner as in Example 1, except that a polyetherketone resin (PEK) (trade name: HT-G22, manufactured by Victrex Japan Inc.) was used in place of the polyetheretherketone resin (PEEK), an insulated wire was obtained, which did not satisfy the relationship represented by formula (2).

Comparative Example 5

In Comparative Example 5, an insulated wire having the same structure of the insulated wire 2 shown in FIG. 3 was produced, except that the insulating coat layer was composed of the thermosetting resin, that the thickness of each of the long side and the short side, and the thickness of the corner portion, of the insulating coat layer, were equal to each other, that the insulated wire did not satisfy the relationship of the formula (1), and that the thickness of the long side of the insulating coat layer was too thick.

As the conductor, use was made of a rectangular conductor (copper having an oxygen content of 15 ppm) having the long side thickness and the short side thickness, and the curvature radius of the corner portion, as shown in Table 2.

By forming the 2 μm-thick inner layer in the same manner as in Example 2, except that a polyetherimide resin (PEI) varnish (trade name: ULTEM 1000, manufactured by SABIC) was used in place of the polyamideimide resin (PAI) varnish, an enamel wire was obtained, which had the inner layer.

By using the thus-obtained enamel wire as a core wire, and forming the insulating coat layer having the thickness of each of the long side, the short side, and the corner portion, and the curvature radius Rr, shown in Table 2, in the same manner as in Example 2, except that a polyamideimide resin (PAI) varnish (trade name: HI406, manufactured by Hitachi Chemical Co., Ltd.) was used in place of the modified polyetheretherketone resin (modified PEEK), an insulated wire was obtained, in which the insulating coat layer was composed of the thermosetting resin, which insulated wire did not satisfy the relationship represented by formula (1), and whose insulating coat layer was too thick in the long side thickness.

Comparative Example 6

In Comparative Example 6, an insulated wire having the same structure of the insulated wire 2 shown in FIG. 3 was produced, except that the thickness of each of the long side and the short side, and the thickness of the corner portion, of the insulating coat layer, did not satisfy the relationship of formula (1), that the ratio of the cross-sectional area of the conductor to the cross-sectional area of the insulated wire did not satisfy the relationship of formula (2), and that the thickness of each of the long side and the short side of the insulating coat layer was too thick.

As the conductor, use was made of a rectangular conductor (copper having an oxygen content of 15 ppm) having the long side thickness and the short side thickness, and the curvature radius of the corner portion, as shown in Table 2.

By forming the inner layer having the thickness described in Table 2, an enamel wire having the inner layer was obtained, in the same manner as in Example 2.

By using the thus-obtained enamel wire as a core wire, and forming the insulating coat layer having the thickness of each of the long side, the short side, and the corner portion, and the curvature radius Rr, shown in Table 2, in the same manner as in Example 2, except that a polyphenylene sulfide resin (PPS) (trade name: PPS FZ-2100, manufactured by DIC Corporation) was used in place of the modified polyetheretherketone resin (modified PEEK), an insulated wire was obtained, which insulated wire did not satisfy the relationships represented by formulae (1) and (2), and whose insulating coat layer was too thick in the long side thickness and the short side thickness.

Comparative Example 7

In Comparative Example 7, an insulated wire having the same structure as the insulated wire 1 shown in FIG. 1 was produced, except that the thickness of each of the long side and the short side of the insulating coat layer was too thick. As the conductor, use was made of a rectangular conductor (copper having an oxygen content of 15 ppm) having the long side thickness and the short side thickness, and the curvature radius of the corner portion, as shown in Table 2.

By forming the insulating coat layer having the thickness of each of the long side, the short side, and the corner portion, and the curvature radius Rr, shown in Table 2, in the same manner as in Example 1, an insulated wire was obtained, whose insulating coat layer was too thick in the long side thickness and the short side thickness.

Each of the properties of the thus-prepared insulated wires was measured and evaluated as described below.

Space Factor

The space factor was evaluated by the conductor space factor, which means the ratio of the cross section area Sc (mm$^2$) of the conductor 11 to the cross section area Sw (mm$^2$) of the insulated wire 1 (or 2).

Evaluation was conducted on the following 4-point scale: the insulated wire having a conductor space factor of 0.90 or more and less than 1.00 is indicated by criterion "A" as having a large effect on improvement in efficiency of the motor;
the insulated wire having a conductor space factor of 0.85 or more and less than 0.90 is indicated by criterion "B" as having such an effect;
the insulated wire having a conductor space factor of 0.80 or more and less than 0.85 is indicated by criterion "C" as having such an effect although it was not very effective; and
the insulated wire having a conductor space factor of less than 0.80 is indicated by criterion "D" as having almost no superiority when compared to the insulated wire having a conductor whose cross sectional shape was circle. At least the criterion "C", as well as the criteria "A" and "B", is an acceptable level.

Edge-Wise Bending Property

The edge-wise bending test was carried out in accordance with JIS 3216-3.

Meanwhile, in order to impose more strict condition on the insulated wire, the edge-wise bending test was carried out by making a 5 μm-deep incision in the portion to be bent of the insulated wire using a feather razor S single-edged razor blade (manufactured by FEATHER Safety Razor Co., Ltd.). The incised insulated wire was wound around a ϕ 1.5 mm stainless steel rod, so that the incision portion would be a center of the insulated wire, followed by bending, for evaluation.

Evaluation was conducted on the following 3-point scale: the insulated wire, in which the insulating coat layer cracked and the crack developed to the whole surface of the conductor, is indicated by the criterion "D";
the insulated wire, in which the insulating coat layer cracked and the crack developed, but did not reach to the conductor, is indicated by the criterion "C"; and
the insulated wire, in which the incision had not been developed by the accompanied extension of the incision portion, is indicated by the criterion "B". At least the criterion "C", as well as the criterion "B", is an acceptable level.

Flat-Wise Bending Property

The flat-wise bending test was carried out, by applying the edge-wise bending property test.

Meanwhile, in order to impose more strict condition in the flat-wise bending, the flat-wise bending test was carried out by making a 5 μm-deep incision in the portion to be bent of the insulated wire using a feather razor S single-edged razor blade (manufactured by FEATHER Safety Razor Co., Ltd.). The incised insulated wire was wound around a ϕ 1.5 mm stainless steel rod, so that the incision portion would be a center of the insulated wire, followed by bending, for evaluation.

Evaluation was conducted on the following 3-point scale: the insulated wire, in which the insulating coat layer cracked and the crack developed to the whole surface of the conductor, is indicated by the criterion "D";
the insulated wire, in which the insulating coat layer cracked and the crack developed, but did not reach to the conductor, is indicated by the criterion "C"; and
the insulated wire, in which the incision had not been developed by the accompanied extension of the incision portion, is indicated by the criterion "B". At least the criterion "C", as well as the criterion "B", is an acceptable level.

Dielectric Breakdown Strength after Elongation

The withstand voltage characteristics of the insulated wire was evaluated, by extending the insulated wire as long as 20% at the extension rate of 300 mm/min using an autograph (manufactured by Shimadzu Corporation), and then measuring a voltage using a dielectric breakdown tester.

Specifically, a ground-side electrode was connected to the portion in which a terminal on one side of the insulated wire was peeled off, and an aluminum foil was wrapped up around the portion at the length of 300 mm from the end of the insulated wire whose terminal was peeled off, and then a high-voltage side electrode was connected to the wrapped aluminum foil. Allowing a voltage rising at the voltage rising rate of 500 V/second, the voltage at the time when an electric current of 15 mA or more flew, was red off. The test was carried out repeatedly at the number of times: n=5. The dielectric breakdown voltage was evaluated by its average value. The dielectric breakdown strength was calculated by dividing this average value with an average value of "a total film thickness of the long side" and "a film thickness of the short side".

Evaluation was conducted on the following 4-point scale: the dielectric breakdown strength of 100 V/μm or more is indicated by the criterion "A";
the dielectric breakdown strength of 80 V/μm or more and less than 100 V/μm is indicated by the criterion "B";
the dielectric breakdown strength of 60 V/μm or more and less than 80 V/μnm is indicated by the criterion "C"; and
the dielectric breakdown strength of less than 60 V/μm is indicated by the criterion "D". The criteria equal to or more than "C", as well as the criteria "A" and "B", is acceptable.

The structures and evaluation results of each insulated wires are shown in Tables 1 and 2.

Note that, overall evaluation was conducted on the following 4-point scale:
the insulated wire which got an A rating in two or more test items and a B rating in other test item(s) is indicated by the overall criterion "A";
the insulated wire which got a B rating in all the test items, or a mixture of an A rating in at least one test item and a C rating in other test item(s), is indicated by the overall criterion "B";
the insulated wire which got a C rating in at least one test item and a B rating in other test item(s) is indicated by the overall criterion "C"; and
the insulated wire which got a D rating in any one of the test items is indicated by the overall criterion "D". The criteria equal to or more than "C", as well as the criteria "A" and "B", is acceptable.

TABLE 1

|  |  | Ex 1 | Ex 2 | Ex 3 | Ex 4 | Ex 5 |
|---|---|---|---|---|---|---|
| Insulating coat layer | Kind | PEEK | modified PEEK | PEEK | PEK | TPI |
|  | Long side resin thickness (μm) | 30 | 36 | 20 | 30 | 47 |
|  | Short side resin thickness (μm) | 30 | 34 | 21 | 30 | 48 |
|  | Corner portion resin thickness (μm) | 40 | 50 | 40 | 50 | 95 |
|  | Curvature radius of corner portion Rr (mm) | 0.3 | 0.3 | 0.2 | 0.1 | 0.2 |
| Inner layer | Kind |  | PAI | PI |  | PEI |
|  | Long side resin thickness (μm) |  | 3 | 3 |  | 2 |
|  | Short side resin thickness (μm) |  | 3 | 3 |  | 2 |
|  | Corner portion resin thickness (μm) |  | 3 | 3 |  | 2 |
| Conductor | Long side length c1 (mm) | 3.2 | 4.5 | 4.7 | 4.2 | 3.2 |
|  | Short side length c2 (mm) | 1.7 | 1.8 | 1.5 | 1.7 | 1.7 |
|  | Curvature radius Rc of corner portion (mm) | 0.3 | 0.3 | 0.1 | 0.1 | 0.3 |
| Resin layer | Total long side resin thickness t1 (μm) | 30 | 39 | 23 | 30 | 49 |
|  | Total short side resin thickness t2 (μm) | 30 | 37 | 24 | 30 | 50 |
|  | Total corner portion resin thickness t3 (μm) | 40 | 53 | 43 | 50 | 97 |
|  | $t3/\{(t1 + t2)/2\}$ | 1.3 | 1.4 | 1.8 | 1.7 | 1.9 |
|  | $t1/(c2 \times 1{,}000)$ | 0.018 | 0.020 | 0.013 | 0.018 | 0.029 |
|  | $t2/(c1 \times 1{,}000)$ | 0.009 | 0.008 | 0.004 | 0.007 | 0.015 |

TABLE 1-continued

|  | | Ex 6 | Ex 7 | Ex 8 | Ex 9 |
|---|---|---|---|---|---|
| | Sc (mm$^2$) | 0.59 | 0.78 | 0.31 | 0.40 | 0.91 |
| | Sw (mm$^2$) | 5.36 | 8.02 | 7.04 | 7.13 | 5.36 |
| | Space factor (Sc/Sw) | 0.90 (A) | 0.91 (A) | 0.96 (A) | 0.95 (A) | 0.85 (B) |
| | Flat-wise bending property | B | B | B | B | C |
| | Edge-wise bending property | B | B | B | B | B |
| | Dielectric breakdown strength after elongation | B | B | A | A | A |
| | Overall evaluation | B | B | A | A | B |

| | | Ex 6 | Ex 7 | Ex 8 | Ex 9 |
|---|---|---|---|---|---|
| Insulating coat layer | Kind | aromatic PA | modified PEEK | PET | PPS |
| | Long side resin thickness (μm) | 40 | 25 | 40 | 20 |
| | Short side resin thickness (μm) | 40 | 27 | 38 | 20 |
| | Corner portion resin thickness (μm) | 85 | 40 | 84 | 24 |
| | Curvature radius of corner portion Rr (mm) | 0.3 | 0.1 | 0.3 | 0.3 |
| Inner layer | Kind | PEsI | | | |
| | Long side resin thickness (μm) | 3 | | | |
| | Short side resin thickness (μm) | 3 | | | |
| | Corner portion resin thickness (μm) | 3 | | | |
| Conductor | Long side length c1 (mm) | 4.5 | 4.2 | 3.2 | 3.2 |
| | Short side length c2 (mm) | 1.8 | 1.7 | 1.7 | 1.7 |
| | Curvature radius Rc of corner portion (mm) | 0.6 | 0.1 | 0.3 | 0.3 |
| Resin layer | Total long side resin thickness t1 (μm) | 43 | 25 | 40 | 20 |
| | Total short side resin thickness t2 (μm) | 43 | 27 | 38 | 20 |
| | Total corner portion resin thickness t3 (μm) | 88 | 40 | 84 | 24 |
| | t3/{(t1 + t2)/2} | 292.0 | 1.5 | 2.2 | 1.2 |
| | t1/(c2 × 1,000) | 0.022 | 0.015 | 0.024 | 0.012 |
| | t2/(c1 × 1,000) | 0.009 | 0.006 | 0.012 | 0.006 |
| | Sc (mm$^2$) | 1.91 | 0.34 | 0.75 | 0.48 |
| | Sw (mm$^2$) | 7.79 | 7.13 | 5.36 | 5.36 |
| | Space factor (Sc/Sw) | 0.80 (C) | 0.95 (A) | 0.88 (B) | 0.92 (A) |
| | Flat-wise bending property | B | B | C | B |
| | Edge-wise bending property | B | B | B | B |
| | Dielectric breakdown strength after elongation | A | A | A | C |
| | Overall evaluation | B | A | B | C |

TABLE 2

| | | C Ex 1 | C Ex 2 | C Ex 3 | C Ex 4 | C Ex 5 |
|---|---|---|---|---|---|---|
| Insulating coat layer | Kind | PEEK | modified PEEK | PPS | PEK | PAI |
| | Long side resin thickness (μm) | 30 | 90 | 20 | 30 | 50 |
| | Short side resin thickness (μm) | 30 | 92 | 21 | 30 | 48 |
| | Corner portion resin thickness (μm) | 30 | 80 | 15 | 50 | 55 |
| | Curvature radius of corner portion Rr (mm) | 0.3 | 0.3 | 0.6 | 1 | 0.3 |
| Inner layer | Kind | PAI | | | | PEI |
| | Long side resin thickness (μm) | 3 | | | | 2 |
| | Short side resin thickness (μm) | 3 | | | | 2 |
| | Corner portion resin thickness (μm) | 3 | | | | 2 |
| Conductor | Long side length c1 (mm) | 3.2 | 2.5 | 4.2 | 4.2 | 3.2 |
| | Short side length c2 (mm) | 1.7 | 1.5 | 1.7 | 1.7 | 1.7 |
| | Curvature radius Rc of corner portion (mm) | 0.3 | 0.3 | 0.6 | 1 | 0.3 |
| Resin layer | Total long side resin thickness t1 (μm) | 33 | 90 | 20 | 30 | 52 |
| | Total short side resin thickness t2 (μm) | 33 | 92 | 21 | 30 | 50 |
| | Total corner portion resin thickness t3 (μm) | 33 | 80 | 15 | 50 | 57 |
| | t3/{(t1 + t2)/2} | 1.0 | 0.9 | 0.7 | 1.7 | 1.1 |
| | t1/(c2 × 1,000) | 0.018 | 0.060 | 0.012 | 0.018 | 0.029 |
| | t2/(c1 × 1,000) | 0.009 | 0.037 | 0.005 | 0.007 | 0.015 |
| | Sc (mm$^2$) | 0.59 | 0.96 | 1.33 | 3.58 | 0.78 |
| | Sw (mm$^2$) | 5.36 | 3.67 | 6.83 | 6.28 | 5.36 |
| | Space factor (Sc/Sw) | 0.90 (A) | 0.79 (D) | 0.84 (C) | 0.64 (D) | 0.87 (B) |
| | Flat-wise bending property | B | D | B | B | D |
| | Edge-wise bending property | B | D | B | B | C |
| | Dielectric breakdown strength after elongation | D | D | D | A | D |
| | Overall evaluation | D | D | D | D | D |

| | | C Ex 6 | C Ex 7 |
|---|---|---|---|
| Insulating coat layer | Kind | PPS | PEEK |
| | Long side resin thickness (μm) | 140 | 60 |
| | Short side resin thickness (μm) | 140 | 60 |
| | Corner portion resin thickness (μm) | 200 | 80 |
| | Curvature radius of corner portion Rr (mm) | 0.3 | 0.3 |
| Inner layer | Kind | PAI | |
| | Long side resin thickness (μm) | 5 | |
| | Short side resin thickness (μm) | 5 | |
| | Corner portion resin thickness (μm) | 3 | |

TABLE 2-continued

| | | | |
|---|---|---|---|
| Conductor | Long side length c1 (mm) | 3.2 | 4.2 |
| | Short side length c2 (mm) | 1.7 | 1.7 |
| | Curvature radius Rc of corner portion (mm) | 0.3 | 0.3 |
| Resin layer | Total long side resin thickness t1 (μm) | 145 | 60 |
| | Total short side resin thickness t2 (μm) | 145 | 60 |
| | Total corner portion resin thickness t3 (μm) | 203 | 80 |
| | t3/{(t1 + t2)/2} | 1.4 | 1.3 |
| | t1/(c2 × 1,000) | 0.082 | 0.035 |
| | t2/(c1 × 1,000) | 0.044 | 0.014 |
| | Sc (mm$^2$) | 1.74 | 1.02 |
| | Sw (mm$^2$) | 5.36 | 7.06 |
| | Space factor (Sc/Sw) | 0.74 (D) | 0.87 (B) |
| | Flat-wise bending property | D | D |
| | Edge-wise bending property | D | D |
| | Dielectric breakdown strength after elongation | B | B |
| | Overall evaluation | D | D |

Note

Conductor long side length c1
Conductor short side length c2
Cross-section area of conductor Sc
Cross-section area of insulated wire Sw
Ex means Example of this invention
C Ex means Comparative Example The kinds of the resin used in the insulating coat layer and the inner layer in Tables 1 and 2 were each described by the following abbreviated resin name.

Insulating coat layer
PEEK: polyetheretherketone resin (manufactured by Victrex Japan Inc., trade name: PEEK450G, bending elastic modulus at 23° C.: 4,200 MPa)
Modified PEEK: modified polyetheretherketone resin (manufactured by Solvay Japan Co., trade name: AVASPIRE AV-650, bending elastic modulus at 23° C.: 3,700 MPa)
PEKK: polyetherketoneketone resin (manufactured by Cytec Industries Inc., bending elastic modulus at 23° C.: 4,500 MPa)
PEK: polyetherketone resin (manufactured by Victrex Japan Inc., trade name: HT-G22, bending elastic modulus at 23° C.: 4,200 MPa)
TPI: thermoplastic polyimide resin (manufactured by Mitsui Chemicals, Inc., trade name: AURUM PL 450C, bending elastic modulus at 23° C.: 2,900 MPa)
Aromatic PA: aromatic polyamide resin (Solvay Specialty Polymers Japan K.K., trade name: AMODEL AT-1001L, bending elastic modulus at 23° C.: 2,210 MPa)
PPS: polyphenylene sulfide resin (manufactured by DIC Corporation, trade name: PPS FZ-2100, bending elastic modulus at 23° C.: 3,800 MPa)
PET: polyethylene terephthalate resin (manufactured by TEIJIN LIMITED, trade name: TR8550N, bending elastic modulus at 23° C.: 2,500 MPa)
PAI: polyamideimide resin (manufactured by Hitachi Chemical Co., Ltd., trade name: HI406, bending elastic modulus at 23° C.: 4,900 MPa)
Inner layer
PAI: polyamideimide resin (manufactured by Hitachi Chemical Co., Ltd., trade name: H1406)
PI: polyimide resin (manufactured by Unitika Ltd., trade name: U IMIDE)
PEI: polyetherimide resin (manufactured by SABIC, trade name: ULTEM 1000)
PEsI: polyesterimide resin (manufactured by Totoku Toryo Co., Ltd., trade name: NEOHEAT 8600 A)

As is apparent from Tables 1 and 2, the insulated wires of Examples 1 to 9, in each of which had the insulating coat layer which was composed of a particular thermoplastic resin; in each of which the long side thickness, the short side thickness, and the corner portion thickness, of the insulating coat layer, satisfies the relationship of formula (1); in each of which the long side and the short side of the insulating coat layer each have a particular thickness; and in each of which the ratio of the cross-sectional area of the conductor to the cross-sectional area of the insulated wire satisfies the relationship of formula (2), were excellent in each of the space factor, the edge-wise and flat-wise bending workability, and the dielectric breakdown strength after extension.

Contrary to the above, the insulated wires of Comparative Examples 1 and 3, in each of which the long side thickness, the short side thickness, and the corner portion thickness, of the insulating coat layer, did not satisfy the relationship of formula (1), did not meet the required dielectric breakdown strength after extension. The insulated wire of Comparative Example 4, in which the ratio of the cross-sectional area of the conductor to the cross-sectional area of the insulated wire did not satisfy the relationship of formula (2), was unsatisfactory in the space factor. The insulated wire of Comparative Example 7, which was too thick in the long side thickness and the short side thickness, of the insulating coat layer, did not meet the required edge-wise and flat-wise bending workability. The insulated wire of Comparative Example 5, which had the insulating coat layer composed of the thermosetting resin, and which did not satisfy the relationship of formula (1), did not meet the required flat-wise bending workability and the dielectric breakdown strength after extension.

Further, the insulated wire of Comparative Example 5, which did not satisfy the relationship of formula (1), and which was too thick in the long side thickness of the insulating coat layer, did not meet the required flat-wise bending workability and the dielectric breakdown strength after extension. The insulated wire of Comparative Example 6, which was too thick in the long side thickness and the short side thickness, of the insulating coat layer, and which did not satisfy the relationship of formula (2), did not meet the required space factor, edge-wise and flat-wise bending workability. Further, the insulated wire of Comparative Example 2, which was too thick in the long side thickness and the short side thickness, of the insulating coat layer, and which did not satisfy the relationships of both formula (1) and formula (2), did not meet any of the required space factor, edge-wise and flat-wise bending workability, and dielectric breakdown strength after extension.

As seen from the above, a motor coil and an electronic or electrical equipment using the insulated wire of the present invention, allow the down-sizing and enhancement of the performance, because cracks can be lowered, in the insulating coat layer of the insulated wire due to bending working at the time of winding working; and a dielectric breakdown strength can be maintained, at the corner portion of the conductor even after the extension; in addition to an excellent space factor can also be enhanced.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2014-265391 filed in Japan on Dec. 26, 2014, which is entirely herein incorporated by reference.

REFERENCE SIGNS LIST 1, 2 Insulated wire
11 Conductor
12 Insulating coat layer
13 Inner layer
Rc Curvature radius at corner portion of conductor cross section
c1 Long side length of conductor cross section
c2 Short side length of conductor cross section
t1 Thickness of the insulating coat layer covered on the surface of the long side of the transverse section of the conductor, which is continuing in the axial direction of the conductor (the long side thickness of the insulating coat layer)
t2 Thickness of the insulating coat layer covered on the surface of the short side of the transverse section of the conductor, which is continuing in the axial direction of the conductor (the short side thickness of the insulating coat layer)
t3 Thickness of the corner portion of the insulating coat layer

The invention claimed is:

1. An insulated wire having an insulating coat layer comprising a thermoplastic resin on an outer peripheral surface of a conductor having a rectangular cross-sectional shape and also having a long side, a short side, and a corner portion having a curvature radius Rc, wherein a thickness t1 (μm) of the insulating coat layer covered on a surface which is continuing in an axial direction of the conductor, and which layer includes a long side of a transverse section of the conductor, a thickness t2 (μm) of the insulating coat layer covered on the surface which is continuing in the axial direction of the conductor, and which layer includes a short side of the transverse section of the conductor, and a corner portion thickness t3 (μm) of the insulating coat layer satisfy formula (1):

$$t3/\{(t1+t2)/2\} \geq 1.2 \qquad \text{Formula (1)}$$

wherein the t1 (μm) and t2 (μm) are each independently 20 μm or more and 50 μm or less, and wherein a ratio of a cross-sectional area Sc (mm$^2$) of the conductor to a cross-sectional area Sw (mm$^2$) of the insulated wire satisfies formula (2):

$$1.0 > Sc/Sw \geq 0.8. \qquad \text{Formula (2)}$$

2. The insulated wire according to claim 1, wherein a long side length c1 (mm) of the transverse section of the conductor is 4.5 mm or less, a short side length c2 (mm) of the transverse section of the conductor is 3.5 mm or less, and a curvature radius Re (mm) of the transverse section of the conductor is 0.60 mm or less, and wherein a combination of t1 (μm) and c2 (mm) or a combination of t2 (μm) and c1 (mm) each satisfy formula (3a) or (3b):

$$0 < t1/(c2 \times 1000) \leq 0.02. \qquad \text{Formula (3a)}$$

$$0 < t2/(c1 \times 1000) \leq 0.02. \qquad \text{Formula (3b)}$$

3. The insulated wire according to claim 1, wherein the thermoplastic resin is a crystalline resin and has a bending elastic modulus at 23° C. of 2,000 MPa or more.

4. The insulated wire according to claim 1, wherein the thermoplastic resin is selected from the group consisting of a polyetheretherketone, a modified polyetheretherketone, a polyetherketoneketone, a polyetherketone, a polyetherketoneetherketoneketone, and a polyphenylene sulfide.

5. A coil, produced by winding working the insulated wire according to claim 1.

6. An electric or electronic equipment, comprising the coil according to claim 5.

* * * * *